US007747256B2

(12) United States Patent
Hanov et al.

(10) Patent No.: US 7,747,256 B2
(45) Date of Patent: Jun. 29, 2010

(54) METHOD AND SYSTEM FOR DETECTING DATA CONGESTION AND APPLYING A CELL RESELECTION OFFSET

(75) Inventors: Steven Michael Hanov, Waterloo (CA); Matthias Wandel, Waterloo (CA)

(73) Assignee: Research In Motion Limited, Waterloo (CA)

( * ) Notice: Subject to any disclaimer, the term of this patent is extended or adjusted under 35 U.S.C. 154(b) by 753 days.

(21) Appl. No.: 11/459,034

(22) Filed: Jul. 21, 2006

(65) Prior Publication Data
US 2008/0020780 A1 Jan. 24, 2008

(51) Int. Cl.
*H04W 72/00* (2009.01)
(52) U.S. Cl. ............... 455/452.2; 455/453; 455/436; 455/438; 370/331; 370/330
(58) Field of Classification Search ............ 455/452.2, 455/436, 473; 370/332
See application file for complete search history.

(56) References Cited
U.S. PATENT DOCUMENTS

| 6,690,939 | B1 * | 2/2004 | Jonsson et al. | 455/453 |
| 6,745,033 | B1 * | 6/2004 | Shah et al. | 455/436 |
| 7,310,526 | B2 * | 12/2007 | Sang et al. | 455/436 |
| 2002/0150063 | A1 * | 10/2002 | Tran | 370/332 |
| 2003/0083069 | A1 * | 5/2003 | Vadgama | 455/436 |
| 2005/0020272 | A1 | 1/2005 | Barve | |
| 2006/0135173 | A1 * | 6/2006 | Vannithamby | 455/453 |

FOREIGN PATENT DOCUMENTS

| EP | 0862346 | 9/1998 |
| EP | 0999716 | 5/2000 |
| GB | 2397469 | 7/2004 |
| GB | 2397469 A | 7/2004 |
| KR | 2003-15859 | 2/2003 |
| WO | 0018164 | 3/2000 |

OTHER PUBLICATIONS

Korean Patent Appln No. 10-2007-0072848, Office Action dated Mar. 6, 2009.
Chinese Patent Appln No. 200710149450.7, Office Action dated Nov. 20, 2009.

* cited by examiner

*Primary Examiner*—David Q Nguyen
(74) *Attorney, Agent, or Firm*—Moffat & Co.

(57) ABSTRACT

A method and apparatus for reducing data congestion in a cell having signal strength, the method having the steps of: assigning a congestion penalty at a mobile device to a cell; applying the congestion penalty to the signal strength to create a selection value; and performing cell reselection using the selection value.

30 Claims, 5 Drawing Sheets

METHOD AND SYSTEM FOR DETECTING DATA CONGESTION AND APPLYING A CELL RESELECTION OFFSET

FIELD OF THE APPLICATION

The present application relates to data congestion in mobile networks and in particular to cell reselection to reduce data congestion.

BACKGROUND

3GPP standards and in particular 3GPP 5.08 requires a mobile device to select a cell to connect to based only on signal strength. As a result, all mobile devices in practice tend to connect to the nearest and strongest cell, sharing its packet data channels, and potentially causing data congestion. This is true even when another cell that is only slightly weaker is available and sits idle. This is true of other types of wireless networks as well.

While in circuit switched channels a handover mechanism exists, for packet data all mobile devices multiplex available channels, thereby resulting in low throughput rates when a large number of mobile devices are connected. The length of data calls also tends to be shorter than voice (circuit switched) calls, making handover during a data call impractical. A data call is referred to herein as a temporary block flow (TBF).

For circuit switched channels, the network initiates the handover. However, network controlled cell reselection is not widely deployed for data. There are existing mechanisms, such as network controlled cell selection, in place that allow for mobiles to be directed to specific cells by the network. These mechanisms typically involve some per-mobile overhead in communicating measurements to the network. Such a mechanism is useful for dealing with a relatively small number of mobiles (less than 10) doing relatively long data transfers. However, for cases where there are hundreds of mobiles doing very short and sporadic transfers, the overhead of network controlled cell selection will cause sufficient overhead to reduce the overall throughput of the network.

For congested cells it is undesirable for a network to control cell reselection since every mobile device connected to the cell would need to constantly send measurement reports to the cell. This would take up packet resources and further reduce network performance.

BRIEF DESCRIPTION OF THE DRAWINGS

The present application will be better understood with reference to the drawings in which:

FIG. 3 is a flow chart of a method to apply a congestion penalty in determining a cell to connect to;

DETAILED DESCRIPTION OF THE DRAWINGS

The present application overcomes the deficiencies of the prior art providing for mobile device initiated cell reselection. The method and apparatus disclosed herein allows many mobiles having short and sporadic data flows to reduce data congestion. Specifically, in the present application a two-fold solution is presented. First, the mobile device monitors messages sent from the base station in order to assess the level of congestion of the cell. Various means for detecting whether the cell is congested can be used. For example, the mobile device can monitor messages both addressed to it and addressed to other mobile devices and use this information to find a level of congestion.

In one embodiment, the mobile device can monitor "access reject" or "packet access reject" messages sent by a base station and use any such messages as an indication of the cell congestion. In other embodiments, clues such as packet downlink dummy control blocks, temporary flow identifiers, the number of mobiles in the packet timing channel, among others, could be used to find an indication of cell congestion.

Once a level of cell congestion is found, preferably a value is assigned to be associated with the level of cell congestion, referred to herein as the congestion penalty. The congestion penalty, in a preferred embodiment, has the units of dB to allow the signal strength of a cell to easily be modified by the congestion penalty.

The congestion penalty from above is then applied to the cell signal strength to create an offset signal strength that can be used to determine which cell to connect to.

In a preferred embodiment, the mobile device can store the congestion penalty for all cells that it can monitor, thereby allowing the signal strengths of seen cells to be offset by their respective congestion penalties.

The present application therefore provides a method of choosing a cell based on data congestion, the method comprising the steps of: assigning a congestion penalty at a mobile device to the cell; applying the congestion penalty to a signal strength of the cell to create a selection value; and performing cell reselection using said selection value.

The present application further provides a mobile device adapted to choose a cell based on data congestion, the mobile device having a radio subsystem including a radio adapted to communicate with a network; a radio processor having a digital signal processor and adapted to interact with said radio subsystem; memory; a user interface; a processor adapted to run user applications and interact with the memory, the radio and the user interface and adapted to run applications, the mobile device characterized by having means for: assigning a congestion penalty at a mobile device to a cell; applying the congestion penalty to the signal strength to create a selection value; and performing cell reselection using said selection value.

Reference is now made to the drawings.

Figure 1:
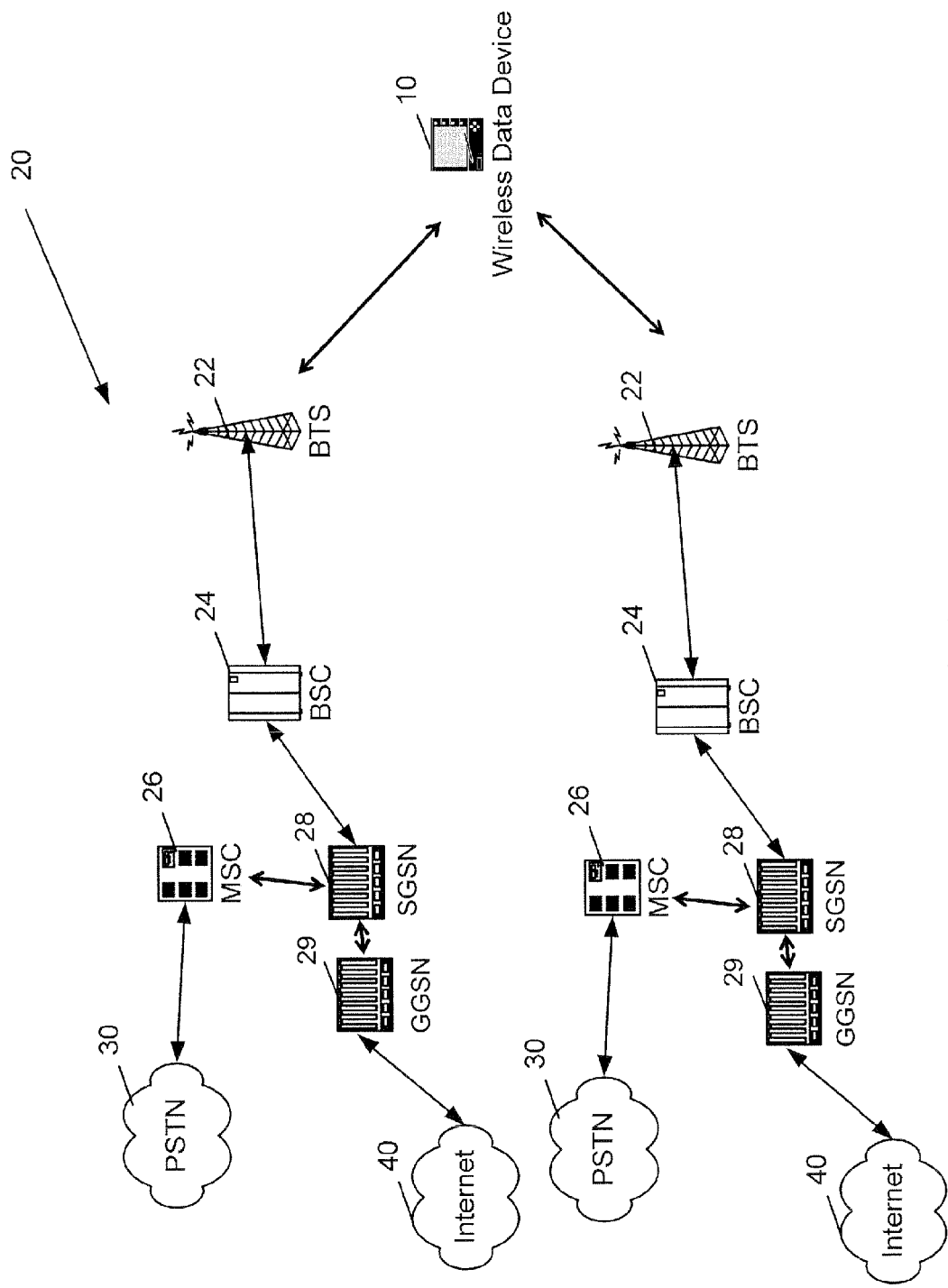
FIG. 1 is a general network diagram showing an exemplary GPRS network.

FIG. 1 is a block diagram of an exemplary wireless data network system with a wireless data device, provided in accordance with the techniques of the present application. The wireless data network system includes a wireless device 10, an exemplary GPRS network 20, a Public Switched Telephone Network (PSTN) 30, and Internet 40. The wireless data device 10 is preferably a two-way communication device having data and/or voice communication capabilities. Network 20 includes mixed circuit and packet switched components: the Base Transceiver Subsystem (BTS) 22 and the Base Station Controller (BSC) 24; a circuit switched only component: Mobile Switching Centre (MSC) 26; and a packet switched only component: GGSN (PDSN) 29.

Operationally, wireless device 10 communicates wirelessly with BTS 22, BSC 24, and serving GPRS support node (SGSN) 28 to gain access to circuit switched services provided by MSC 26—such as voice and Short Message Service (SMS) via PSTN 30. Wireless device 10 also communicates wirelessly with BTS 22 and BSC 24 to gain access to packet data services provided by gateway GPRS support node (GGSN) 29—such as e-mail, WAP, and other data services via Internet 40.

As illustrated in FIG. 1, wireless data device 10 can communicate with various base stations 22.

Figure 2:
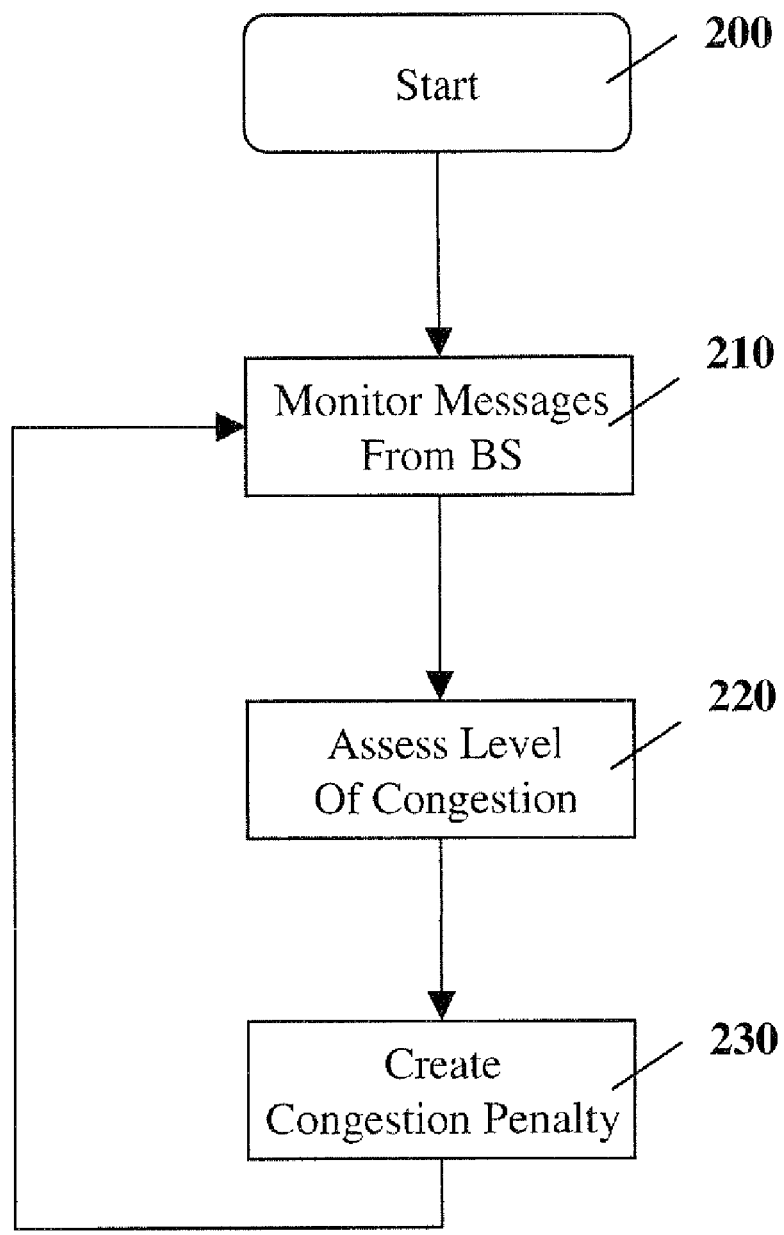
FIG. 2 is a flow chart of a method to determine a congestion penalty.

FIG. 2 shows a flow chart of a method for finding a "congestion penalty" to apply in a cell selection algorithm. The method of FIG. 2 starts at step 200 and proceeds to step 210 in which the mobile device monitors messages from a base station. As will be appreciated by those skilled in the art, the mobile device may monitor messages addressed to both it and other mobile devices. The information gathered may then be used to find the level of congestion of its cell.

Typically, if the mobile device is not in a TBF, it may be monitoring the background control channel (BCCH). When a TBF is started, the base station assigns the mobile device to a packet data traffic channel (PDTCH). The mobile device can then monitor the packet data channel.

All messages transmitted by the base station include header information and may be read by all mobile devices monitoring transmissions from the base station. This enables a mobile device to choose which messages to receive. In other words, the mobile device can choose only to accept messages addressed to it.

The header information and signaling messages can, however, also be useful to other mobile devices to determine the level of congestion in the cell. All mobile devices can decode signaling messages. Various methods for determining congestion are discussed below.

In one embodiment, a mobile device can monitor access reject messages sent to any mobile device on the cell. As will be appreciated, in GPRS and GSM networks, the 3GPP standards define various access reject messages. For example, 3GPP 4.18 defines an access reject on a control channel. 3GPP 4.60 defines a packet access reject for when the mobile device is monitoring a packet data traffic channel.

As indicated above, all mobile devices are able to decode signaling messages. This contrasts with data messages, which are typically encrypted for a specific mobile device.

One such signaling message is an access reject message. An access reject message is sent to a mobile that makes a request to transmit data. A cell can indicate to the mobile that there are no available resources and try again in X seconds or milliseconds, where X is a particular value. Alternatively, the cell can indicate that the mobile should not attempt to transmit again.

An access reject message is a good indication that the cell is busy. If the cell is not allowing mobile devices to transmit then it likely has insufficient resources to handle all the TBFs at that time.

In step 220 of FIG. 2, the messages that are monitored in step 210 are assessed. In the above example of monitoring access reject messages sent by the base station, the level of congestion could be determined based on the number of access reject messages that are received at the mobile device.

The process then proceeds to step 230 in which a congestion penalty is created, In a preferred embodiment, the congestion penalty is a value that is assigned in dB. In other words, the congestion penalty is a value that can be directly applied to a signal strength value to thereby create an offset value.

In one embodiment, every time the mobile device, in step 220, sees an access reject message, the process at step 230 can increment the congestion penalty that was previously created. In other words, the first time a mobile device sees an access reject message on a cell, it can assign a value of, for example, 3 dB as the congestion penalty. Thereafter, successive access reject messages received and assessed at step 220 can increment this congestion penalty in step 230.

A second access reject message can therefore cause the mobile device to have a congestion penalty of 6 dB and the third can have the mobile device assign a congestion penalty to a cell of 9 dB.

As will be appreciated by those skilled in the art, a maximum value for the congestion penalty can also be specified. For example, 9 dB could be the maximum value that is allowed for a congestion penalty.

Alternatives to finding a congestion penalty are also available. Clues to the number of mobile devices on the cell could, for example, include counting the number of packet downlink dummy control blocks. These are defined in the 3GPP 4.60 standard. A packet downlink dummy control block is sent when a base station has nothing to transmit. In order to transmit something, these dummy blocks are sent. An indication of how busy the network is can be determined based on how many of the packet downlink dummy blocks the mobile device receives. Therefore if a mobile device receives a large number of these packet downlink dummy control blocks, it can determine that the cell is not busy. Conversely, if the mobile device does not receive any package downlink dummy control blocks, it can determine that the cell is busy.

A further clue to how busy the cell is could be the temporary flow identifier. The temporary flow identifier is a value, for example, 0 to 31, assigned by the base station to all mobiles sharing a specific channel. While the absolute value of the temporary flow identifier is not useful since the base station cycles through these values, the number of different temporary flow identifiers assigned could be used to determine the number of mobile devices sharing the channel.

As will be appreciate by those skilled in the art, the temporary flow identifier may not be determinative since the base station cycles quickly through the temporary flow identifiers. However, it still may be useful to determine how many mobile devices are sharing the channel.

A third clue could include monitoring the number of mobile devices in the packet timing advance control channel (PTCCH). The cell has spaces for 16 mobile devices to indicate the correct timing of messages sent to and from the mobile devices. A count of how many mobile devices are addressed in the channel could be useful to determine network congestion. Specifically, if a large number of channels are defined, the cell may be determined to be busy.

As with the temporary flow identifier above, the PTCCH may provide some problems in determining how congested the network is since one mobile may be assigned two different slots (for example uplink and downlink). The PTCCH may however still be useful to determine cell congestion.

Additional clues to congestion include, but are not limited to, the number of "immediate assignment messages" that a mobile device can see on the paging channel (PCH) or the paging control channel (PCCH), or the number of times the cell has to rely on extended paging.

Other options for determining cell congestion would also be apparent with regard to the present application to those skilled in the art, and the present application is not meant to be limited to any of the above methods for determining the level of congestion.

As will be further appreciated, other algorithms besides incrementing a penalty value on receipt of a message could be used. Various indicators could both increase and decrease the congestion penalty in step 230. For example, time could be used to slowly decrease a congestion penalty. If a mobile device receives an access reject message, it may increase the congestion penalty. However, if no access reject message is received in a specific amount of time the congestion penalty may be slowly decreased in order to provide a more accurate level of congestion for the specific network. Other options include using the number of packet downlink dummy control blocks to also reduce the congestion penalty. If a large number of packet downlink dummy control blocks are received this may indicate that the network is no longer as congested as it was before and allow the mobile device to decrease the congestion penalty.

Figure 3:
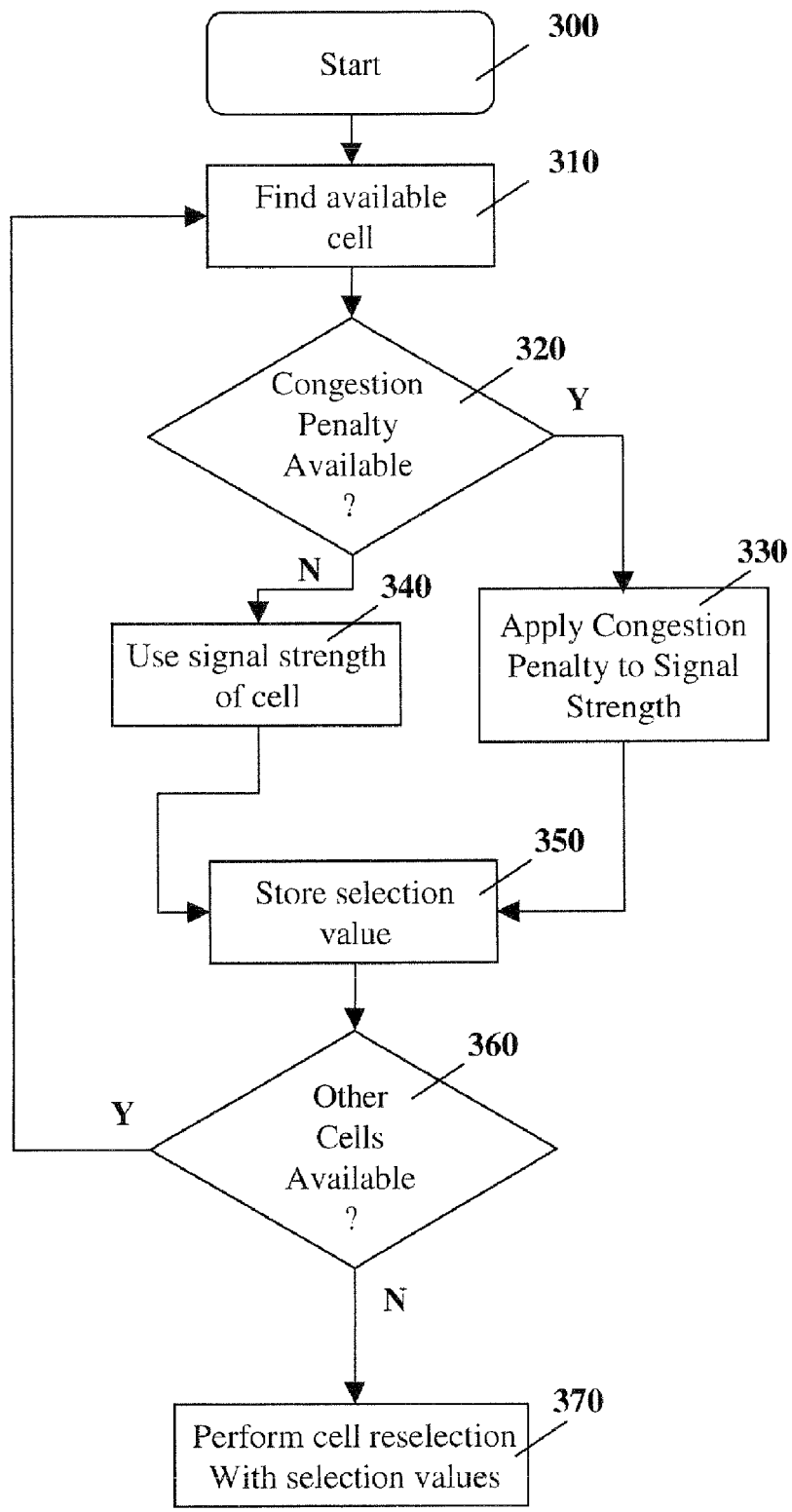

Once the level of congestion is determined in step 220 and a congestion penalty is assigned in step 230, the mobile device must determine which cell to connect to. As will be appreciated, mobile devices continuously monitor all cells available to them and will connect to the preferred cell. In the prior art, the preferred cell was the cell with the highest signal strength minus certain offsets provided by the network. However, as indicated in the present application, a congestion penalty offset can be used to determine which cell to connect to. Reference is now made to FIG. 3.

In FIG. 3, an exemplary algorithm is presented for finding available cells and determining the best cell to connect to. The algorithm of FIG. 3 is exemplary for the principles involved, and is not meant to limit a mobile device to the specific algorithm.

In FIG. 3, the process starts at step 300 and proceeds to step 310. In step 310, the mobile device finds a cell that is available to it. In this case, any cell that the mobile device can detect is a cell available to it.

From step 310, the mobile proceeds to step 320 in which it checks whether a congestion penalty is available for the available cell. In a preferred embodiment, the mobile device keeps track of any congestion penalties that it has previously determined for a specific cell. As will be appreciated, the mobile device can only create cell congestion penalties for cells that it has connected to in the past. The mobile device may, even after cell reselection, keep this cell congestion penalty for the cell as long as that cell is available to the mobile device. Therefore, this cell congestion penalty can be used in future determinations to indicate which cell to connect to.

The process of step 320 will not have a cell congestion penalty available for any cell that the mobile device has not connected to previously. If, in step 320, a cell congestion penalty is determined to be available, the process proceeds to step 330 in which the cell congestion penalty is applied to the signal strength of the detected cell. As indicated above, the cell congestion penalty is preferably stored in dB and can therefore be directly subtracted from (or added to, if the penalty is stored as a negative) the detected signal strength.

As will be appreciated, the cell reselection algorithm defined in 3GPP 5.08 standards indicate that for every cell monitored, a mobile device knows its signal strength, offsets and parameters. These offsets and parameters are defined in the standards. The signal strength is taken and offsets are subtracted to create a value of C1, C2, C31 or C32. The above describes a method for adding an additional congestion penalty to subtract to from C1, C2, C31 or C32.

Conversely, if no cell congestion penalty is available for the particular cell in step 320, the process proceeds to step 340 in which the received signal strength of the cell is noted.

From step 330 or 340, the process proceeds to step 350 in which the selection value for the particular cell is stored. The selection value is preferably stored in relation to the Absolute Radio Frequency Channel Number (ARFCN) and Base Station Identity Code (BSIC) which uniquely identify each base station in an area. Thereafter, the specific base station is associated with the congestion penalty in order to determine a cell reselection The process next proceeds to step 360 in which it checks whether other cells are available. If other cells are available, the process proceeds back to steps 310 to 350 for the other cells. Conversely, if step 360 determines that no other cells are available, the process proceeds to step 370 in which a cell is selected based on the selection value stored in step 350.

As will be appreciated, the congestion penalty may also be time limited. Thus, the mobile device does not have new data concerning the cell congestion of a particular cell for a specific period of time, it can erase the previous cell congestion penalty.

Applying the above, a worse case scenario is that all cells have a maximum congestion penalty assigned to them. In this case, the congestion penalty becomes meaningless since the same cell congestion penalty is subtracted from all signal strengths, and in effect the signal strength is used for cell selection. Therefore, the above alternatives of using time or of erasing the congestion penalty when the mobile device can no longer see the cell are used.

The above method is described with relation to FIG. 3 thereby allows the cell selection to be determined both by signal strength and by a congestion penalty. A cell can be compared to its neighbors to determine the alternate cell to connect to.

While the above uses GPRS standards to illustrate cell reselection and messages sent, one skilled in the art would realize that the above could be equally applied to other networks.

Figure 4:
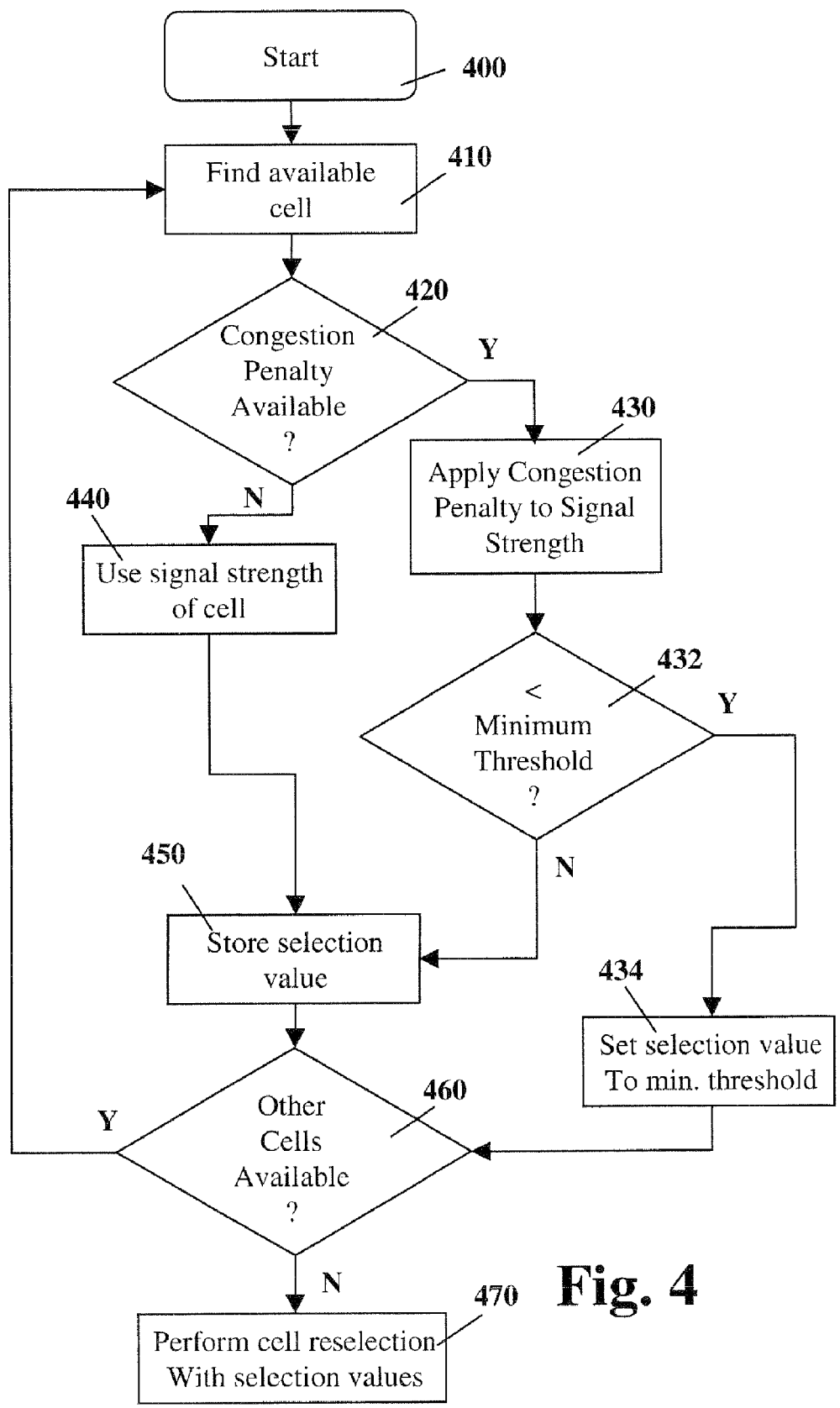
FIG. 4 is a flow chart of an alternative embodiment of the cell selection algorithm of FIG. 3.

Reference is now made to FIG. 4. FIG. 4 illustrates a flow chart for cell selection within an alternative embodiment to that of FIG. 3. As will be appreciated, each base station defines a minimum signal strength threshold that can be used to determine whether a mobile device should attempt to connect to that base station. Specifically, if the signal strength is below the threshold or defined by the base station, the mobile device should not attempt to connect to the base station.

In the present case, it is undesirable to reduce the signal strength below the minimum signal strength threshold. Doing so would cause the mobile device to consider the cell as one that is not able to connect to, when in fact the cell is available.

In the embodiment of FIG. 4, steps 400, 410, 420, 440, 460 and 470 are the same as steps 310, 320, 340, 350, 360 and 370 of FIG. 3.

After step 430 in the embodiment of FIG. 4, however, the mobile device next proceeds to step 432 in which it checks to see whether or not the signal strength minus the congestion penalty is less than the minimal threshold for connecting to the base station. If yes, the mobile device proceeds to step 434 in which it sets the selection value to the minimum connection threshold. Optionally, in step 434 the congestion value could be ignored and the selection value could be merely the originally detected signal strength.

From step 432, if the signal strength minus the congestion penalty is greater than the minimum threshold, the process proceeds to step 450 in which the selection value is stored.

From step 450 or step 434, the mobile device proceeds to step 460 and the method proceeds as in the process of FIG. 3.

The above ensures that the signal strength does not fall below a minimal convention threshold.

Figure 5:
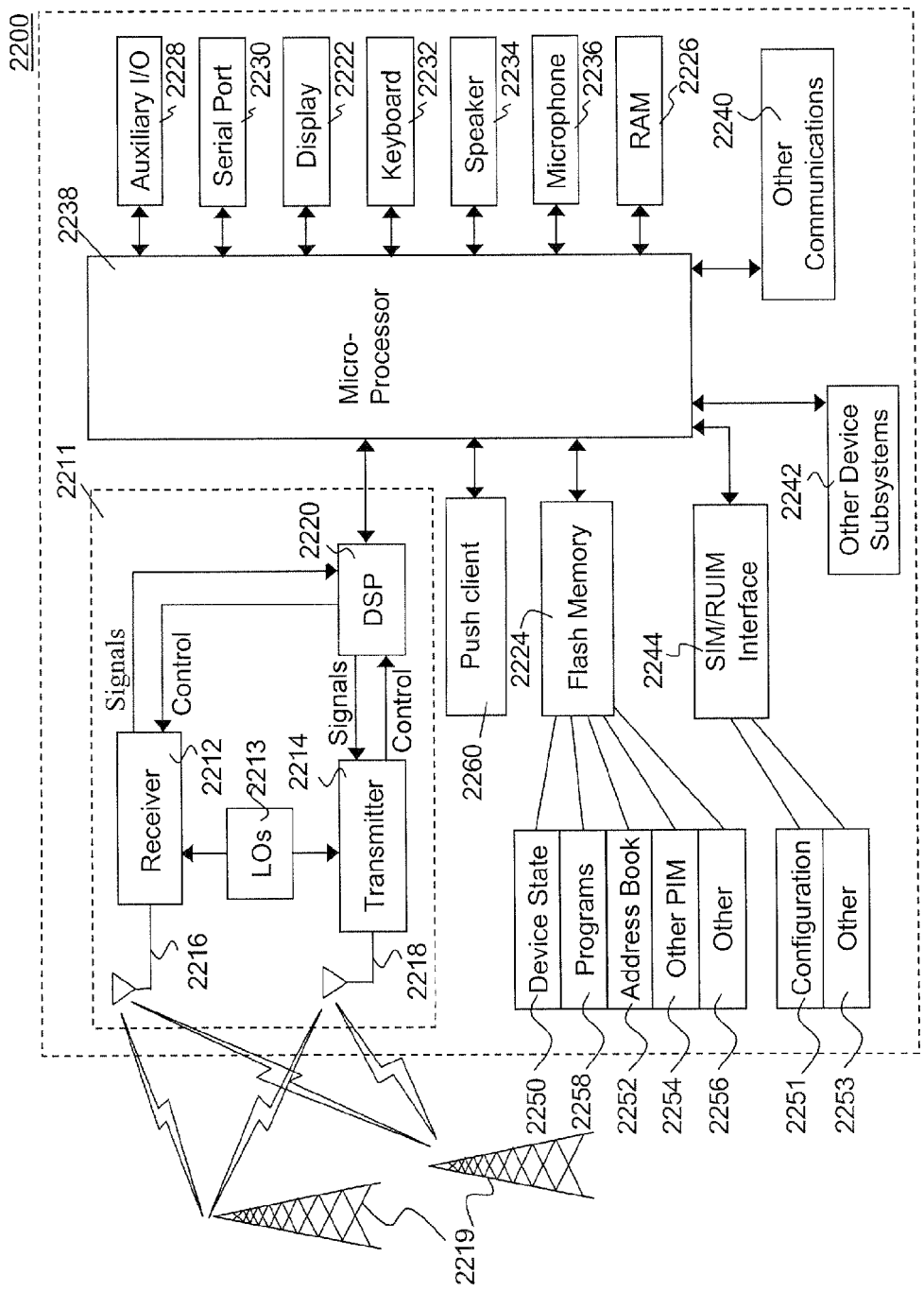
FIG. 5 is a block diagram of an exemplary mobile device that can be used in association with the present method and apparatus.

While various mobile devices could be used to implement the above-captioned method and apparatus, an exemplary mobile device is illustrated in FIG. 5. The mobile device of FIG. 5 is not meant to be limiting, but merely provides an example of a mobile device that could be used in association with the present method and apparatus.

FIG. 5 is a block diagram illustrating a mobile device apt to be used with preferred embodiments of the apparatus and method of the present application. Mobile device 2200 is preferably a two-way wireless communication device having at least voice and data communication capabilities. Mobile device 2200 preferably has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, or a data communication device, as examples.

Where mobile device 2200 is enabled for two-way communication, it will incorporate a communication subsystem 2211, including both a receiver 2212 and a transmitter 2214, as well as associated components such as one or more, preferably embedded or internal, antenna elements 2216 and 2218, local oscillators (LOs) 2213, and a processing module such as a digital signal processor (DSP) 2220. As will be apparent to those skilled in the field of communications, the particular design of the communication subsystem 2211 will be dependent upon the communication network in which the device is intended to operate.

Network access requirements will also vary depending upon the type of network 2219. In some CDMA networks network access is associated with a subscriber or user of mobile device 2200. A CDMA mobile device may require a removable user identity module (RUIM) or a subscriber identity module (SIM) card in order to operate on a CDMA network. The SIM/RUIM interface 2244 is normally similar to a card-slot into which a SIM/RUIM card can be inserted and ejected like a diskette or PCMCIA card. The SIM/RUIM card can have approximately 64K of memory and hold many key configuration 2251, and other information 2253 such as identification, and subscriber related information.

When required network registration or activation procedures have been completed, mobile device 2200 may send and receive communication signals over the network 2219. As illustrated in FIG. 5, network 2219 can consist of multiple base stations communicating with the mobile device. For example, in a hybrid CDMA 1x EVDO system, a CDMA base station and an EVDO base station communicate with the mobile device and the mobile device is connected to both simultaneously. The EVDO and CDMA 1x base stations use different paging slots to communicate with the mobile device.

Signals received by antenna 2216 through communication network 2219 are input to receiver 2212, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 2220. In a similar manner, signals to be transmitted are processed, including modulation and encoding for example, by the DSP 2220 and input to transmitter 2214 for digital to analog conversion, frequency up conversion, filtering, amplification and transmission over the communication network 2219 via antenna 2218. The DSP 2220 not only processes communication signals, but also provides for receiver and transmitter control. For example, the gains applied to communication signals in receiver 2212 and transmitter 2214 may be adaptively controlled through automatic gain control algorithms implemented in the DSP 2220.

Mobile device 2200 preferably includes a microprocessor 2238 which controls the overall operation of the device. Communication functions, including at least data and voice communications, are performed through communication subsystem 2211. Microprocessor 2238 also interacts with further device subsystems such as the display 2222, flash memory 2224, random access memory (RAM) 2226, auxiliary input/output (I/O) subsystems 2228, serial port 2230, two or more keyboards or keypads 2232, speaker 2234, microphone 2236, other communication subsystem 2240 such as a short-range communications subsystem and any other device subsystems generally designated as 2242. Serial port 2230 could include a USB port or other port known to those in the art.

Some of the subsystems shown in FIG. 5 perform communication-related functions, whereas other subsystems may provide "resident" or on-device functions. Notably, some subsystems, such as keyboard 2232 and display 2222, for example, may be used for both communication-related functions, such as entering a text message for transmission over a communication network, and device-resident functions such as a calculator or task list.

Operating system software used by the microprocessor 2238 is preferably stored in a persistent store such as flash memory 2224, which may instead be a read-only memory (ROM) or similar storage element (not shown). Those skilled in the art will appreciate that the operating system, specific device applications, or parts thereof, may be temporarily loaded into a volatile memory such as RAM 2226. Received communication signals may also be stored in RAM 2226.

As shown, flash memory 2224 can be segregated into different areas for both computer programs 2258 and program data storage 2250, 2252, 2254 and 2256. These different storage types indicate that each program can allocate a portion of flash memory 2224 for their own data storage requirements. Microprocessor 2238, in addition to its operating system functions, preferably enables execution of software applications on the mobile device. A predetermined set of applications that control basic operations, including at least data and voice communication applications for example, will normally be installed on mobile device 2200 during manufacturing. Other applications could be installed subsequently or dynamically.

A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 2219. In a preferred embodiment, the PIM data items are seamlessly integrated, synchronized and updated, via the wireless network 2219, with the mobile device user's corresponding data items stored or associated with a host computer system. Further applications may also be loaded onto the mobile device 2200 through the network 2219, an auxiliary I/O subsystem 2228, serial port 2230, short-range communications subsystem 2240 or any other suitable subsystem 2242, and installed by a user in the RAM 2226 or preferably a non-volatile store (not shown) for execution by the microprocessor 2238. Such flexibility in application installation increases the functionality of the device and may provide enhanced on-device functions, communication-related functions or both. For example, secure communication applications may enable electronic commerce functions and other such financial transactions to be performed using the mobile device 2200.

In a data communication mode, a received signal such as a text message or web page download will be processed by the communication subsystem 2211 and input to the microprocessor 2238, which preferably further processes the received signal for output to the display 2222, or alternatively to an auxiliary I/O device 2228.

A user of mobile device 2200 may also compose data items such as email messages for example, using the keyboard 2232, which is preferably a complete alphanumeric keyboard or telephone-type keypad, in conjunction with the display 2222 and possibly an auxiliary I/O device 2228. Such composed items may then be transmitted over a communication network through the communication subsystem 2211.

For voice communications, overall operation of mobile device 2200 is similar, except that received signals would preferably be output to a speaker 2234 and signals for transmission would be generated by a microphone 2236. Alternative voice or audio I/O subsystems, such as a voice message recording subsystem, may also be implemented on mobile device 2200. Although voice or audio signal output is preferably accomplished primarily through the speaker 2234, display 2222 may also be used to provide an indication of the identity of a calling party, the duration of a voice call, or other voice call related information for example.

Serial port 2230 in FIG. 5, would normally be implemented in a personal digital assistant (PDA)-type mobile device for which synchronization with a user's desktop computer (not shown) may be desirable, but is an optional device component. Such a port 2230 would enable a user to set preferences through an external device or software application and would extend the capabilities of mobile device 2200 by providing for information or software downloads to mobile device 2200 other than through a wireless communication network. The alternate download path may for example be used to load an encryption key onto the device through a direct and thus reliable and trusted connection to thereby enable secure device communication. As will be appreciated by those skilled in the art, serial port 2230 can further be used to connect the mobile device to a computer to act as a modem.

Other communications subsystems 2240, such as a short-range communications subsystem, is a further optional component which may provide for communication between mobile device 2200 and different systems or devices, which need not necessarily be similar devices. For example, the subsystem 2240 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method of choosing a cell based on data congestion in a wireless network, the method comprising the steps of:
    assessing at said mobile device a level of congestion for a cell;
    assigning at said mobile device a congestion penalty to the cell based on said level of congestion;
    applying at said mobile device the congestion penalty to a signal strength offset of the cell to create a selection value; and
    performing cell reselection using said selection value.

2. The method of claim 1, wherein said assessing step includes the step of monitoring messages sent to any mobile device within said cell.

3. The method of claim 2, wherein said congestion penalty is based on messages monitored in said monitoring step.

4. The method of claim 3, wherein said congestion penalty is adjusted if one of an access reject or a packet access reject message are monitored in said monitoring step.

5. The method of claim 4, wherein said congestion penalty is assigned a value in dB.

6. The method of claim 5, wherein said congestion penalty is adjusted for each access reject or packet access reject message received.

7. The method of claim 6, wherein the congestion penalty includes a maximum value.

8. The method of claim 5, wherein said congestion penalty decreases over time.

9. The method of claim 3, wherein the congestion penalty is adjusted if a number of packet downlink dummy control blocks received is below a predetermined threshold.

10. The method of claim 3, wherein the congestion penalty is adjusted if a number of packet downlink dummy control blocks received is above a predetermined threshold.

11. The method of claim 3, wherein the congestion penalty is adjusted if a number of temporary flow identifiers monitored by the mobile device is above a predetermined threshold.

12. The method of claim 1, wherein the assessing step includes the step of monitoring numbers of mobile devices in a packet timing advance control channel and the congestion penalty is adjusted based on a count of mobile devices in the channel.

13. The method of claim 1, wherein the selection value comprises subtracting the congestion penalty from the received signal strength.

14. The method of claim 1, wherein the mobile device stores congestion penalties for cells previously assessed.

15. The method of claim 14, wherein said performing step includes using a selection value for any cell for which the mobile device has a congestion penalty and a signal strength for any cell for which the mobile device does not have a congestion penalty.

16. A mobile device adapted to choose a cell based on data congestion, the mobile device having a radio subsystem including a radio adapted to communicate with a network; a radio processor having a digital signal processor and adapted to interact with said radio subsystem; memory; a user interface; a processor adapted to run user applications and interact with the memory, the radio and the user interface and adapted to run applications, the mobile device configured to
    assess at said mobile device a level of congestion for a cell;
    assign at said mobile device a congestion penalty to the cell based on said assessed level of congestion;
    apply the congestion penalty to the signal strength offset to create a selection value; and
    perform cell reselection using said selection value.

17. The mobile device of claim 16, wherein the mobile device is configured to monitor messages sent to any mobile device within said cell.

18. The mobile device of claim 17, wherein the mobile device is configured to assess a congestion penalty based on messages monitored.

19. The mobile device of claim 18, wherein said congestion penalty is adjusted if one of an access reject or a packet access reject message are monitored.

20. The mobile device of claim 19, wherein said congestion penalty is assigned a value in dB.

21. The mobile device of claim 20, wherein said congestion penalty is adjusted for each access reject or packet access reject message received.

22. The mobile device of claim 21, wherein the congestion penalty includes a maximum value.

23. The mobile device of claim 16, wherein the congestion penalty is adjusted over time.

24. The mobile device of claim 19, wherein the congestion penalty is adjusted if a number of packet downlink dummy control blocks received by the mobile device is below a predetermined threshold.

25. The mobile device of claim 19, wherein the congestion penalty is adjusted if a number of packet downlink dummy control blocks received by the mobile device is above a predetermined threshold.

26. The mobile device of claim 19, wherein the congestion penalty is adjusted if a number of temporary flow identifiers monitored by the mobile device is above a predetermined threshold.

27. The mobile device of claim 16, wherein the mobile device is configured to monitor numbers of mobile devices in a packet timing advance control channel and adjust the congestion penalty based on a count of mobile devices in the channel.

28. The mobile device of claim 16, wherein the selection value comprises subtracting the congestion penalty from the signal strength of the cell.

29. The mobile device of claim 16, wherein the mobile device stores congestion penalties for cells previously assessed.

30. The mobile device of claim 29, wherein the mobile device is configured to use a selection value for any cell for which the mobile device has a congestion penalty and a signal strength for any cell for which the mobile device does not have a congestion penalty.

* * * * *